Aug. 16, 1932.          H. D. GEYER          1,871,883
                  CASING FOR UNIVERSAL JOINTS
                  Filed July 12, 1929    2 Sheets-Sheet 1

Inventor
Harvey D. Geyer
By Spencer Hardman & Jehr
His Attorneys

Aug. 16, 1932.  H. D. GEYER  1,871,883
CASING FOR UNIVERSAL JOINTS
Filed July 12, 1929   2 Sheets-Sheet 2

Inventor
Harvey D. Geyer
By Spencer Hardman & Fehr
His Attorneys

Patented Aug. 16, 1932

1,871,883

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

CASING FOR UNIVERSAL JOINTS

Application filed July 12, 1929. Serial No. 377,840.

This invention relates to a housing or casing for universal joints and is especially adapted for use as a casing for the universal joint in an automobile propeller shaft where there is a relative axial movement between the parts connected by said joint.

An object of this invention is to provide a casing for a universal joint which is largely of metal and hence is of more rugged construction and long-lasting than boots of flexible material such as are in common use.

A more specific object is to provide a metal casing surrounding the universal joint and which is attached to and moves with one of the universal joint members but clears the second member at all times, and a flexible non-metallic closure collar or diaphragm closing the opening between said metal casing and second member.

Further objects and advantages of the present invention will be apparent from the following description, reference being had to the accompanying drawings, wherein a preferred embodiment of one form of the present invention is clearly shown.

In the drawings.

Similar reference characters refer to similar parts throughout the various views.

Figure 4:
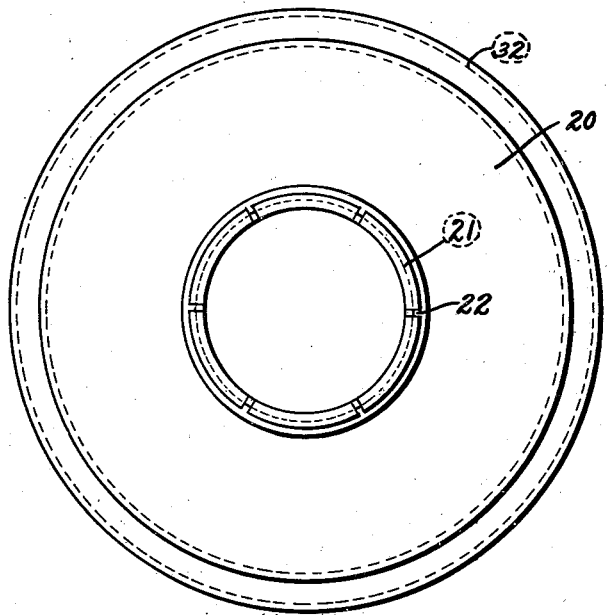
Fig. 4 is an end view of the bell-shaped metal housing detached from other parts.

Numeral 10 marks one of the main members of the universal joint while 11 marks the other. In this well known type of universal joint, member 10 is of hollow, circular construction and surrounds all the mechanism of the joint except that portion of member 11 which projects therefrom, as clearly illustrated. Member 10 has a flange 12 whereby it may be suitably fixed to one of the parts to be connected by the universal joint, while member 11 is shown as having an enlarged end portion 13 which may be internally splined for suitably fixing it to the shaft 15, or the shaft 15 may be fixed to portion 13 by any other well known and suitable means. The two main members 10 and 11 are not only universally angularly movable relative to each other but they are also axially movable toward or away from each other a predetermined travel, as clearly disclosed in Figs. 1 to 3. This type of universal joint is well known and forms no part of this present invention, which relates only to the protective housing or casing for the joint which easily permits all the possible relative movements between the members 10 and 11.

Figure 3:
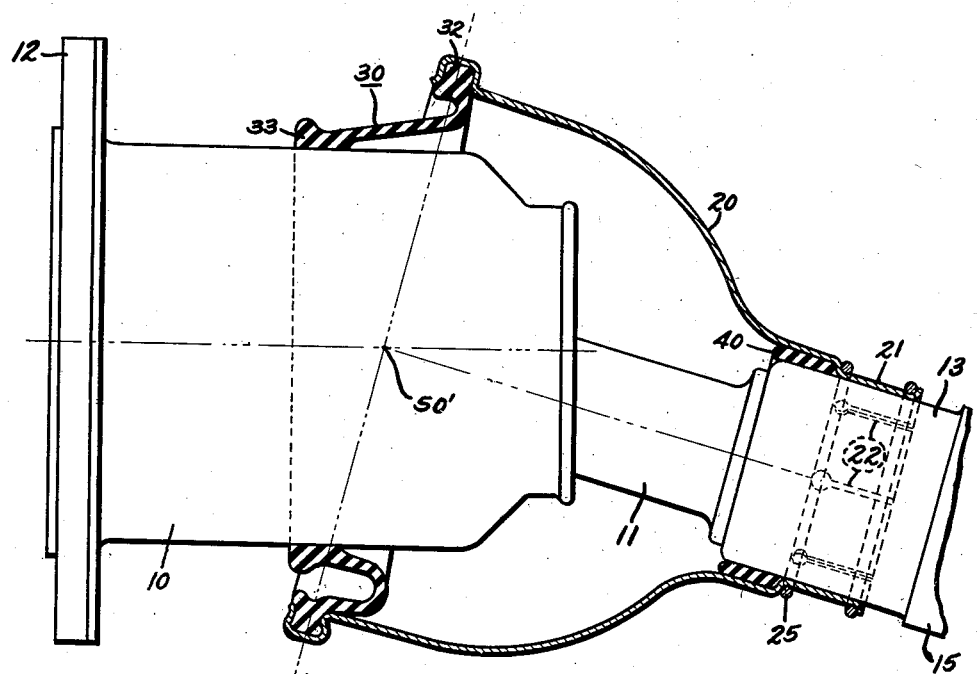
Fig. 3 is a view similar to Fig. 2, but shows the universal joint axially extended from its normal position shown in Fig. 1.

20 marks a bell-shaped metal housing having a small cylindrical end 21 which fits snugly around end portion 13 of member 11. Preferably the cylindrical portion 21 is provided with a series of slots 22 which permit it to be contracted sufficiently to be clamped tightly upon end portion 13 by a suitable ring clamp 25 such as clearly shown in Fig. 1. Obviously when the small stove bolt 24 is drawn up tight the cylindrical end 21 will be rigidly clamped to the end portion 13 of member 11. The bell-shaped housing 20 will therefore be substantially rigid with member 11 and will move therewith both angularly and axially relative to member 10, as shown in the positions of Figs. 2 and 3. The bell housing 20 is made sufficiently large to clear all parts of member 10 for all relative positions of members 10 and 11, the closest position being shown in Fig. 2 where members 10 and 11 are axially contracted their maximum amount and disposed at the maximum angle relative to one another.

The large open end of bell housing 20 is of course spaced from the outer surface of the cylindrical member 10 at all times. This otherwise open space is closed by a flexible closure collar or diaphragm 30 whose outer periphery is secured to the bell housing 20 and whose inner periphery is secured to the member 10, thus providing a complete closure. Preferably the outer periphery of collar 30 has a bead 31 of soft rubber or other elastic material which may be snapped into a corresponding groove 32 provided therefor in housing 20 and these parts thus held securely together. The inner periphery of collar 30 may be held upon the outer surface of member 10 by an elastic ring portion 33 which is slightly stretched to slip snugly over member 10 and hence provides a close fit at all times without any additional attaching means. However, if desired, any suitable form of ring clamp could easily be used to positively clamp ring portion 33 upon member 10. Preferably collar 30 is made by being molded from a soft flexible rubber which may be reinforced with a fibrous or textile material by any well known process, if desired. Collar 30 is preferably molded to the substantially U-shaped form shown clearly in Fig. 1, that is, to its normal or non-distorted form obtaining when the members 10 and 11 are in their aligned and normal axial position.

Figure 1:
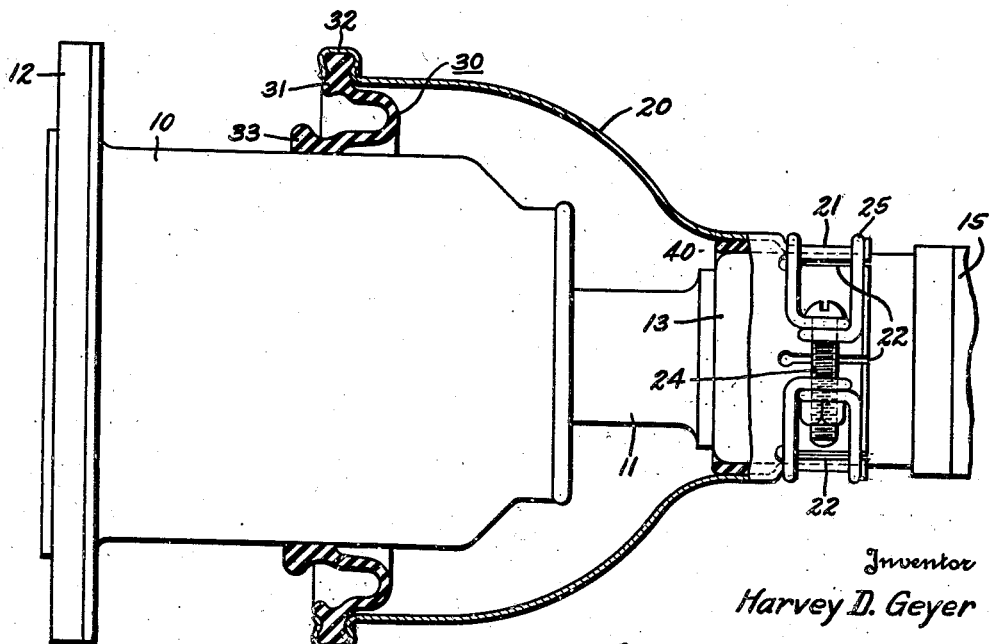
Fig. 1 is a view showing the casing of this invention applied to a universal joint. The casing is shown in section except for a small portion thereof.
Figure 2:
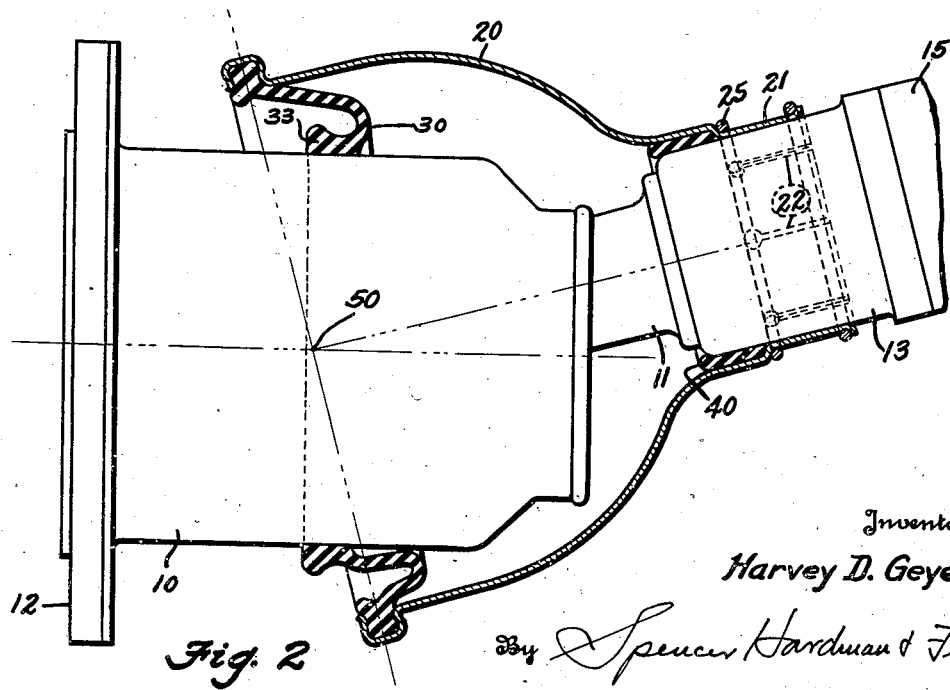
Fig. 2 is a sectional view similar to Fig. 1, but shows the universal joint axially contracted from its normal position of Fig. 1 as well as having its two main members angularly disposed.

In operation, the easy flexibility of the U-shaped collar 30 obviously prevents stress on said collar during axial or to and fro movements between members 10 and 11 when these members are substantially aligned as shown in Fig. 1. Angular movements between members 10 and 11 are likewise permitted simply by a straightening out of the U-shape of collar 30 on the extended side thereof and a closer doubling-up of the U-shape on the opposite side. A combination of axial and angular movements between members 10 and 11 causes the maximum distortion of collar 30, as illustrated in Figs. 2 and 3. In Fig. 2, the axis of member 11 intersects the axis of member 10 at point 50 which is nearly in line with the left edge of ring 33 of collar 30, thus showing that members 10 and 11 have been moved toward one another, that is, that the universal joint has been contracted. In Fig. 3, the joint has been extended so that the intersection of the axes of members 10 and 11 falls at point 50' which is considerably toward the right from the plane of ring 33. In each case the manner of distorting the flexible collar 30 is clearly illustrated. When bell housing 20 is clamped upon the member 11, preferably a soft rubber bushing 40 is clamped in place as clearly shown in the drawings. This elastic bushing 40 not only serves as a lubricant packing to prevent the possible escape of lubricant from the housing 20 through the slots 22, but also prevents any possible ringing sound of housing 20 caused by vibrations.

While the form of embodiment of the present invention as herein disclosed, constitutes a preferred form, it is to be understood that other forms might be adapted, all coming within the scope of the claim which follows.

What is claimed is as follows:

In combination, a universal joint having two members relatively slidable as well as universally swingable relative to each other, a metal housing secured to one of said members and overlapping the second member in spaced relation therewith so as to clear same in all relative positions of said members, and a molded elastic rubber closure collar having on its outer periphery a molded bead fixed to said metal housing and on its inner periphery a resilient ring snugly surrounding said second member by its elastic stretch, said closure collar having a substantially U-shaped section when said members are in their aligned or normal position, whereby to simply provide for both sliding and angular movements between said members.

In testimony whereof I hereto affix my signature.

HARVEY D. GEYER.